United States Patent
Baker

(10) Patent No.: US 9,808,107 B2
(45) Date of Patent: Nov. 7, 2017

(54) PORTABLE STEAM-PRODUCING APPARATUS AND METHODS OF MAKING AND USING THE SAME

(71) Applicant: Russell Christopher Baker, Columbus, GA (US)

(72) Inventor: Russell Christopher Baker, Columbus, GA (US)

(*) Notice: Subject to any disclaimer, the term of this patent is extended or adjusted under 35 U.S.C. 154(b) by 39 days.

(21) Appl. No.: 14/805,493

(22) Filed: Jul. 22, 2015

(65) Prior Publication Data

US 2016/0106252 A1 Apr. 21, 2016

Related U.S. Application Data

(60) Provisional application No. 62/065,856, filed on Oct. 20, 2014.

(51) Int. Cl.
| | |
|---|---|
| F24H 1/06 | (2006.01) |
| A47J 27/04 | (2006.01) |
| A47J 27/00 | (2006.01) |
| A47J 36/06 | (2006.01) |
| A47J 36/34 | (2006.01) |
| F22B 1/28 | (2006.01) |
| A23L 5/10 | (2016.01) |

(52) U.S. Cl.
CPC ............... *A47J 27/04* (2013.01); *A23L 5/13* (2016.08); *A47J 27/002* (2013.01); *A47J 36/06* (2013.01); *A47J 36/34* (2013.01); *F22B 1/28* (2013.01); *A47J 2027/043* (2013.01)

(58) Field of Classification Search
CPC ...... A47J 27/04; A47J 27/13; A47B 31/02; F24H 1/06
USPC ..................... 122/DIG. 10; 237/67
See application file for complete search history.

(56) References Cited

U.S. PATENT DOCUMENTS

| | | | | |
|---|---|---|---|---|
| 3,563,158 | A * | 2/1971 | Omer ................. | A47J 27/0817 220/315 |
| 5,711,210 | A * | 1/1998 | Kaufman ............ | A47J 27/10 126/9 R |
| 5,975,071 | A * | 11/1999 | Babington ........... | A47J 27/10 126/33 |
| 7,100,599 | B2 * | 9/2006 | Babington ........... | A47J 27/18 126/376.1 |
| 8,651,065 | B1 * | 2/2014 | Eash ................... | A01K 7/027 119/72 |
| 8,674,268 | B2 * | 3/2014 | Clark, Jr. ............ | A01K 7/027 119/73 |
| 2005/0034716 | A1 * | 2/2005 | Harbin ................ | A47J 37/01 126/25 R |
| 2010/0206291 | A1 * | 8/2010 | Axinte ................ | A47J 36/025 126/25 R |
| 2012/0276260 | A1 * | 11/2012 | Duncan .............. | A47J 37/0786 426/314 |
| 2014/0227401 | A1 * | 8/2014 | Kounlavong ........ | A47J 27/09 426/231 |
| 2015/0312964 | A1 * | 10/2015 | Sorenson ............ | A47J 37/0611 219/448.13 |

* cited by examiner

*Primary Examiner* — Gregory A Wilson

(74) *Attorney, Agent, or Firm* — Withers & Keys, LLC

(57) ABSTRACT

A portable steam-producing apparatus is disclosed. Methods of making and using portable steam-producing apparatus are also disclosed.

20 Claims, 18 Drawing Sheets

PORTABLE STEAM-PRODUCING APPARATUS AND METHODS OF MAKING AND USING THE SAME

CROSS-REFERENCE TO RELATED APPLICATIONS

This patent application claims the benefit of priority to U.S. provisional patent application Ser. No. 62/065,856 entitled "PORTABLE STEAM-PRODUCING APPARATUS AND METHODS OF MAKING AND USING THE SAME" filed on Oct. 20, 2014, the subject matter of which is incorporated herein in its entirety.

TECHNICAL FIELD

The present invention relates to portable apparatus for preparing food (e.g., meat and/or vegetables).

BACKGROUND

There is a need in the art for improved portable apparatus for preparing food (e.g., meat and/or vegetables).

SUMMARY

The present invention addresses the problems in the art by providing a portable steam-producing apparatus suitable for preparing food (e.g., meat and/or vegetables).

Accordingly, the present invention is directed to a portable steam-producing apparatus comprising: a water tank comprising a tank volume surrounded by (i) a tank bottom wall and (ii) one or more tank side walls extending upward from said tank bottom wall; a tank lid attached to at least one side wall of said one or more tank side walls, said tank lid being sized so as to extend over said tank volume and enclose said tank volume when in a lid closed position; at least one heating element positioned along a lower tank surface of said tank bottom wall, said at least one heating element being capable of heating a liquid positioned within said tank volume; and one or more legs attached to said water tank, each of said one or more legs being movable from (i) a leg storage position in which a length of each leg is positioned along a leg storage surface of said apparatus (e.g., along and parallel with a tank lower surface of the apparatus) to (ii) a leg use position in which each leg extends outward from said water tank (e.g., downward from a tank lower surface of the apparatus).

The present invention is further directed to methods of making and using the disclosed portable steam-producing apparatus.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

DETAILED DESCRIPTION OF THE INVENTION

The present invention is directed to portable steam-producing apparatus. The present invention is further directed to methods of making and using portable steam-producing apparatus.

The portable steam-producing apparatus of the present invention may comprise a number of components. A description of individual components and combinations of individual components is provided in the embodiments and claims below.

Figure 1:
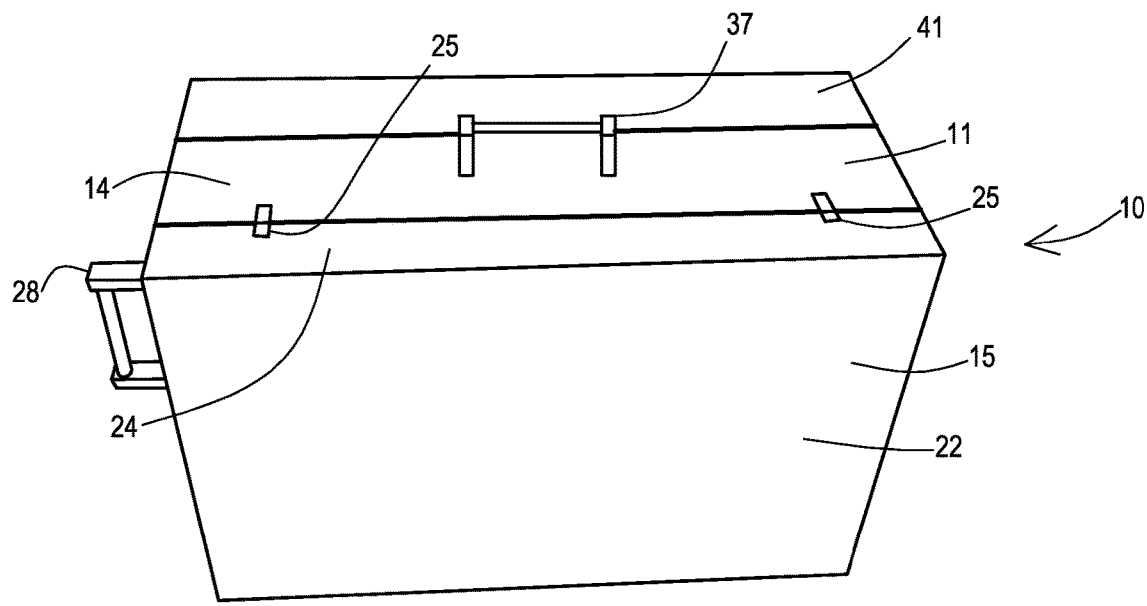
FIG. 1 depicts a photograph of an exemplary portable steam-producing apparatus of the present invention when in a storage configuration.
Figure 2:
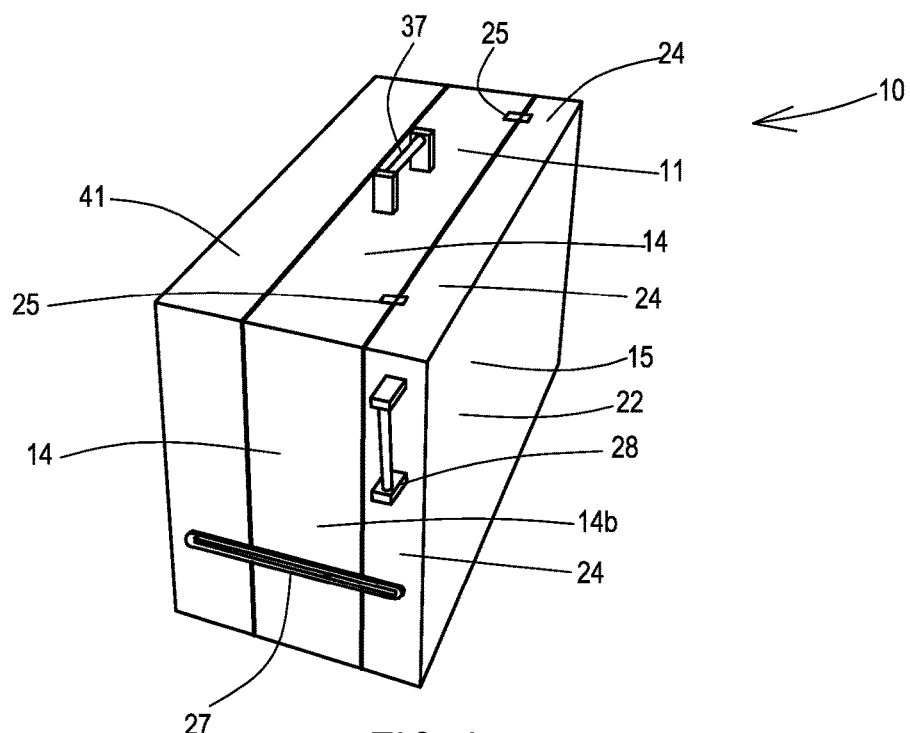
FIG. 2 depicts a photograph of a side view of the exemplary portable steam-producing apparatus shown in FIG. 1.
Figure 3:
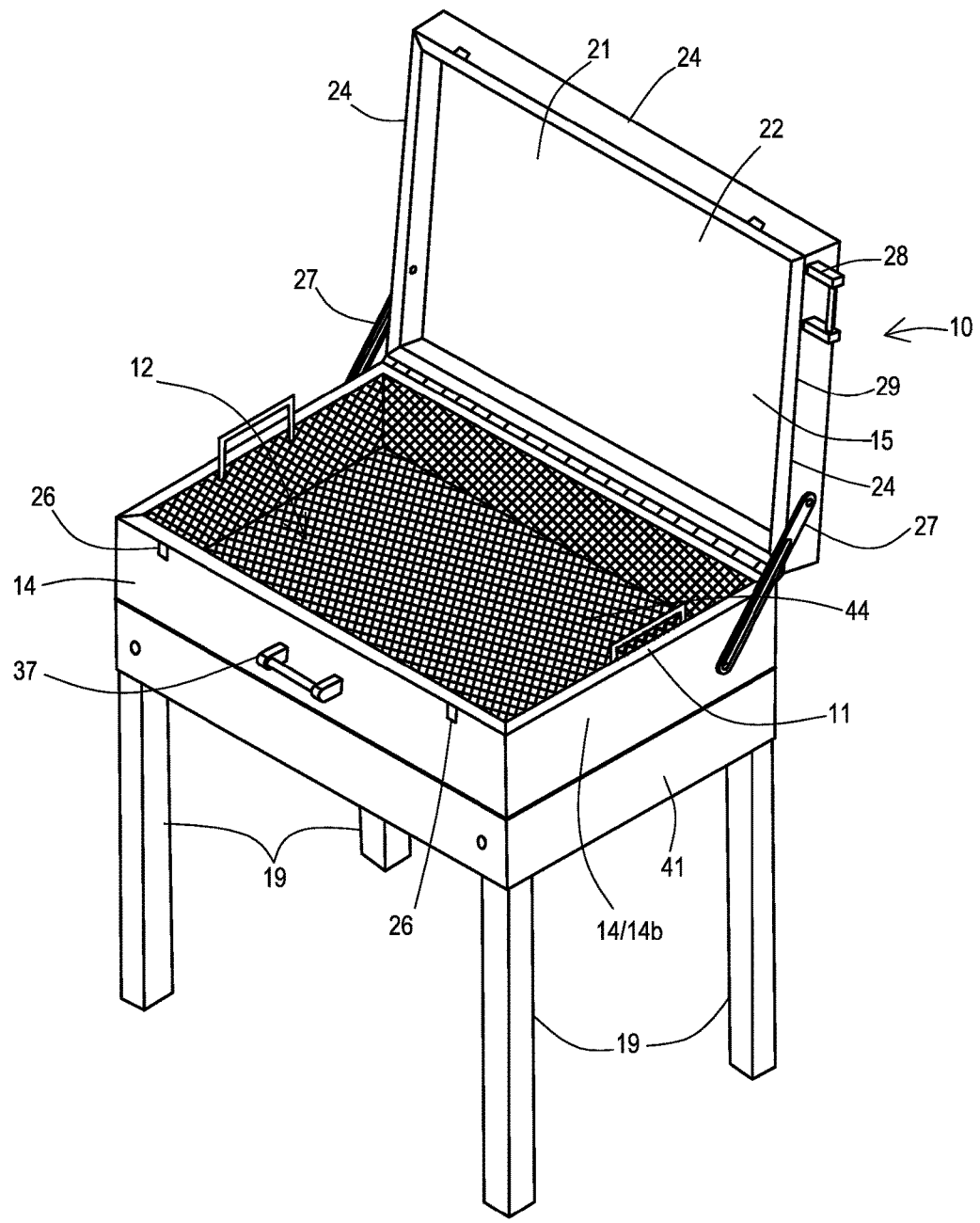
FIG. 3 depicts a photograph of the exemplary portable steam-producing apparatus shown in FIG. 1 when in a use configuration with a lid component in an open position.
Figure 4:
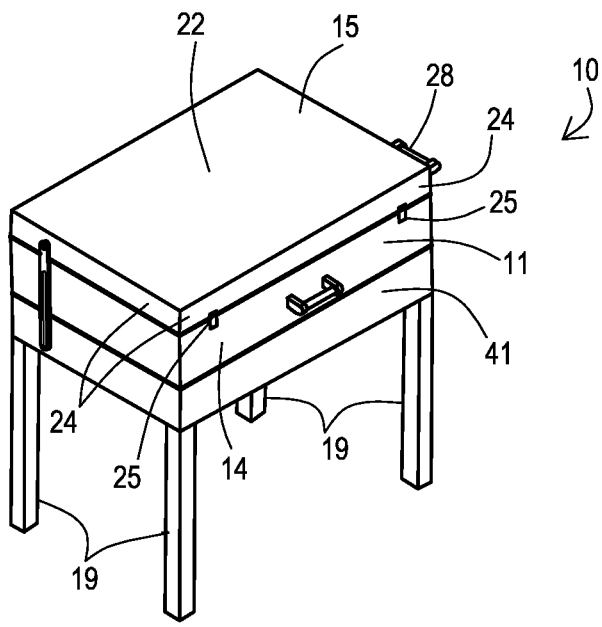
FIG. 4 depicts a photograph of the exemplary portable steam-producing apparatus shown in FIG. 1 when in a use configuration with a lid component in a closed position.
Figure 5:
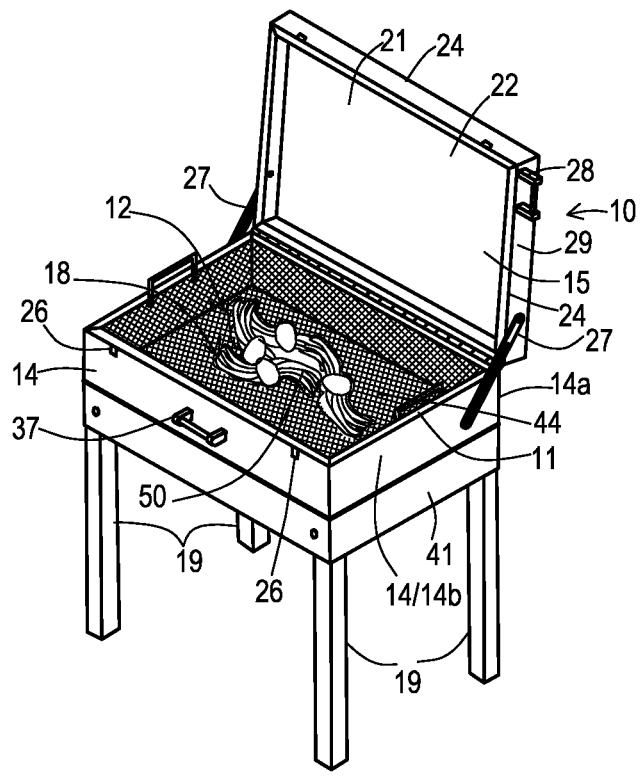
FIG. 5 depicts a photograph of the exemplary portable steam-producing apparatus shown in FIG. 1 when in use with a lid component in an open position and food items (e.g., crab legs) positioned within a removable screen member within a tank volume of the exemplary portable steam-producing apparatus.
Figure 6:
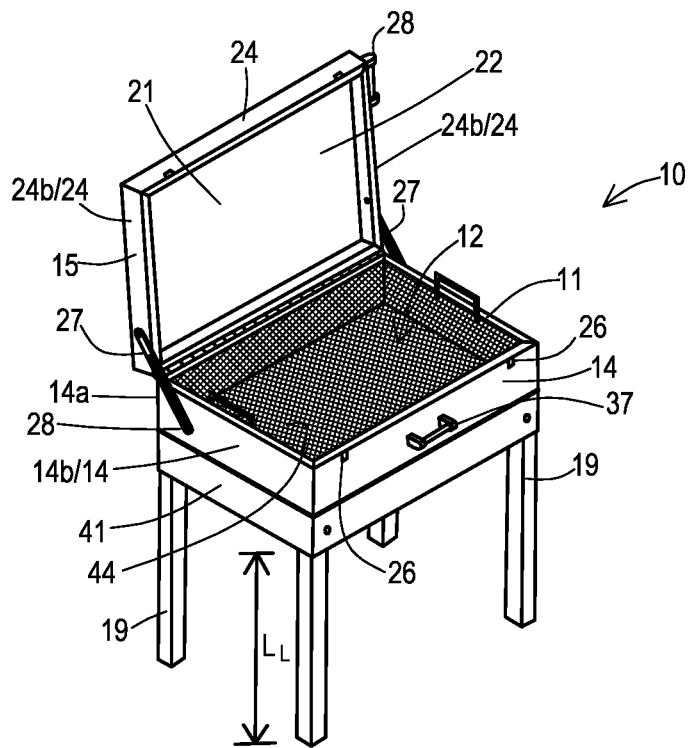
FIG. 6 depicts a perspective view of an exemplary portable steam-producing apparatus of the present invention when in a use configuration with a lid component in an open position.
Figure 7:
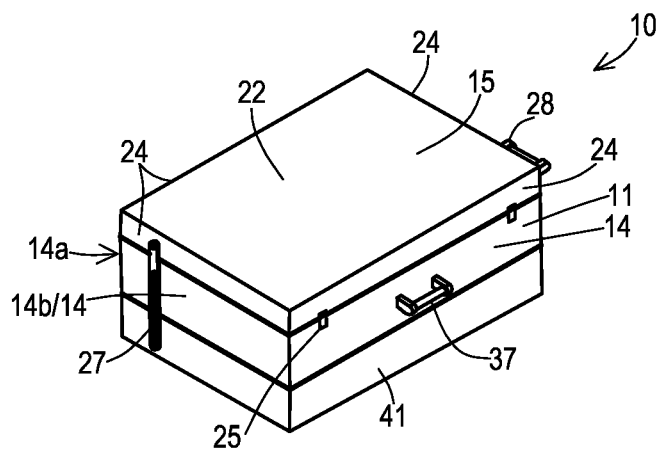
FIG. 7 depicts a perspective view of the exemplary portable steam-producing apparatus shown in FIG. 6 when in a storage configuration.
Figure 8:
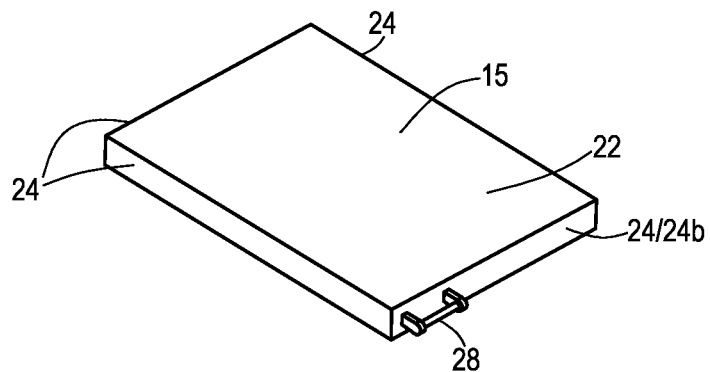
FIG. 8 depicts a perspective view of an exemplary tank lid component suitable for use with the exemplary portable steam-producing apparatus shown in FIG. 6.
Figure 9:
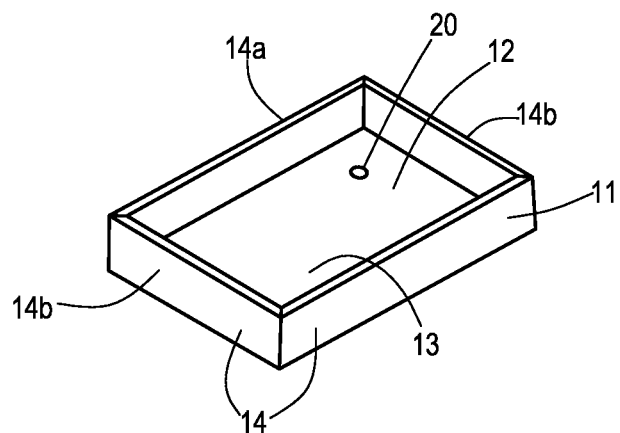
FIG. 9 depicts a perspective view of an exemplary water tank component suitable for use with the exemplary portable steam-producing apparatus shown in FIG. 6.

Other Embodiments:

Portable Steam-Producing Apparatus:

1. A portable steam-producing apparatus 10 comprising: a water tank 11 comprising a tank volume 12 surrounded by (i) a tank bottom wall 13 and (ii) one or more tank side walls 14 extending upward from said tank bottom wall 13; a tank lid 15 attached to at least one side wall 14 of said one or more tank side walls 14, said tank lid 15 being sized so as to extend over said tank volume 12 and enclose said tank volume 12 when in a lid closed position (see, for example, FIGS. 1-2, 4 and 7); at least one heating element 16 positioned along a lower tank surface 17 of said tank bottom wall 13, said at least one heating element 16 being capable of heating a liquid 18 (see, FIG. 5) positioned within said tank volume 12; and one or more legs 19 attached to said water tank 11, each of said one or more legs 19 being movable from (i) a leg storage position (see, for example, FIGS. 1-2 and 7) in which a length $L_L$ (see, FIG. 6) of each leg 19 is positioned along a leg storage surface (e.g., along and parallel with lower tank surface 17) of said apparatus 10 to (ii) a leg use position (see, for example, FIGS. 3-6) in which each leg 19 extends outward from said water tank 11.

2. The portable steam-producing apparatus 10 of embodiment 1, wherein said tank volume 12 is up to about 12.0 cubic feet ($ft^3$).

3. The portable steam-producing apparatus 10 of embodiment 1 or 2, wherein said tank volume 12 is from about 1.0 $ft^3$ to about 5.0 $ft^3$.

4. The portable steam-producing apparatus 10 of any one of embodiments 1 to 3, wherein said tank volume 12 is from about 2.0 $ft^3$ to about 2.5 $ft^3$.

5. The portable steam-producing apparatus 10 of any one of embodiments 1 to 4, wherein said one or more tank side walls 14 comprises four tank side walls 14. See, for example, FIGS. 1-7 and 9.

6. The portable steam-producing apparatus 10 of any one of embodiments 1 to 5, wherein said one or more tank side walls 14 of said water tank 11 forms a rectangular outer tank side surface shape. See again, for example, FIGS. 1-7 and 9.

Figure 18:
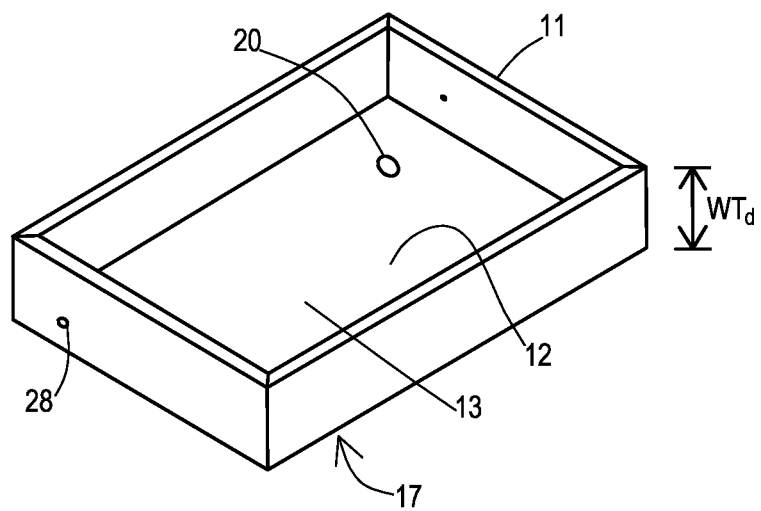

7. The portable steam-producing apparatus 10 of any one of embodiments 1 to 6, wherein said water tank 11 further comprises at least one water tank drain hole 20 extending through said tank bottom wall 13. See, for example, FIGS. 9 and 18.

8. The portable steam-producing apparatus 10 of any one of embodiments 1 to 7, wherein said water tank 11 further comprises a single water tank drain hole 20 extending through said tank bottom wall 13.

9. The portable steam-producing apparatus 10 of any one of embodiments 1 to 8, wherein said tank lid 15 is attached to a rear tank side wall 14a of said one or more tank side walls 14.

10. The portable steam-producing apparatus 10 of any one of embodiments 1 to 9, wherein said tank lid 15 is attached to opposite tank side walls 14b of said one or more tank side walls 14.

11. The portable steam-producing apparatus 10 of any one of embodiments 1 to 10, wherein said tank lid 15 comprises a tank lid volume 21 surrounded by (i) an upper lid wall 22 and (ii) one or more lid side walls 24 extending downward from said upper lid wall 22. See, for example, FIGS. 3, 5-6 and 15-17.

12. The portable steam-producing apparatus 10 of any one of embodiments 1 to 11, wherein said tank lid 15 comprises a tank lid volume 21 surrounded by (i) an upper lid wall 22 and (ii) four lid side walls 24 extending downward from said upper lid wall 22. See again, for example, FIGS. 3, 5-6 and 15-17.

13. The portable steam-producing apparatus 10 of any one of embodiments 1 to 12, wherein said tank lid 15 is movable from said lid closed position (see, for example, FIGS. 1-2, 4 and 7) to a lid open position (see, for example, FIGS. 3 and 5-6) while attached to said at least one tank side wall 14 of said one or more tank side walls 14.

14. The portable steam-producing apparatus 10 of any one of embodiments 1 to 13, wherein said tank lid 15 further comprises a lid locking component 25 that enables locking of said tank lid 25 to said water tank 11 when in said lid closed position. Note, water tank 11 comprises a complementary water tank locking component 26 for each lid locking component 25 to enable locking of said tank lid 25 to said water tank 11 when in said lid closed position.

15. The portable steam-producing apparatus 10 of any one of embodiments 1 to 14, wherein said tank lid 15 further comprises one or more lid positioning members 27 adapted to fix said tank lid 15 in a lid open position (i.e., as shown, for example, in FIGS. 3 and 5-6). Note, water tank 11 comprises a complementary water tank lid positioning member 28 for each lid positioning members 27 to enable fixing of said tank lid 25 in the lid open position.

16. The portable steam-producing apparatus 10 of any one of embodiments 1 to 15, wherein said tank lid 15 further comprises two lid positioning members 27 adapted to fix said tank lid 15 in a lid open position, said two lid positioning members 27 being along opposite sides 24b of said lid 15.

17. The portable steam-producing apparatus 10 of any one of embodiments 1 to 16, wherein said tank lid 15 further comprises a lid handle 28 extending along an outer lid surface 29. See, for example, FIGS. 1-2 and 17.

18. The portable steam-producing apparatus 10 of any one of embodiments 1 to 17, wherein said tank lid 15 further comprises a lid handle 28 extending along an outer lid side surface 29.

Figure 26:
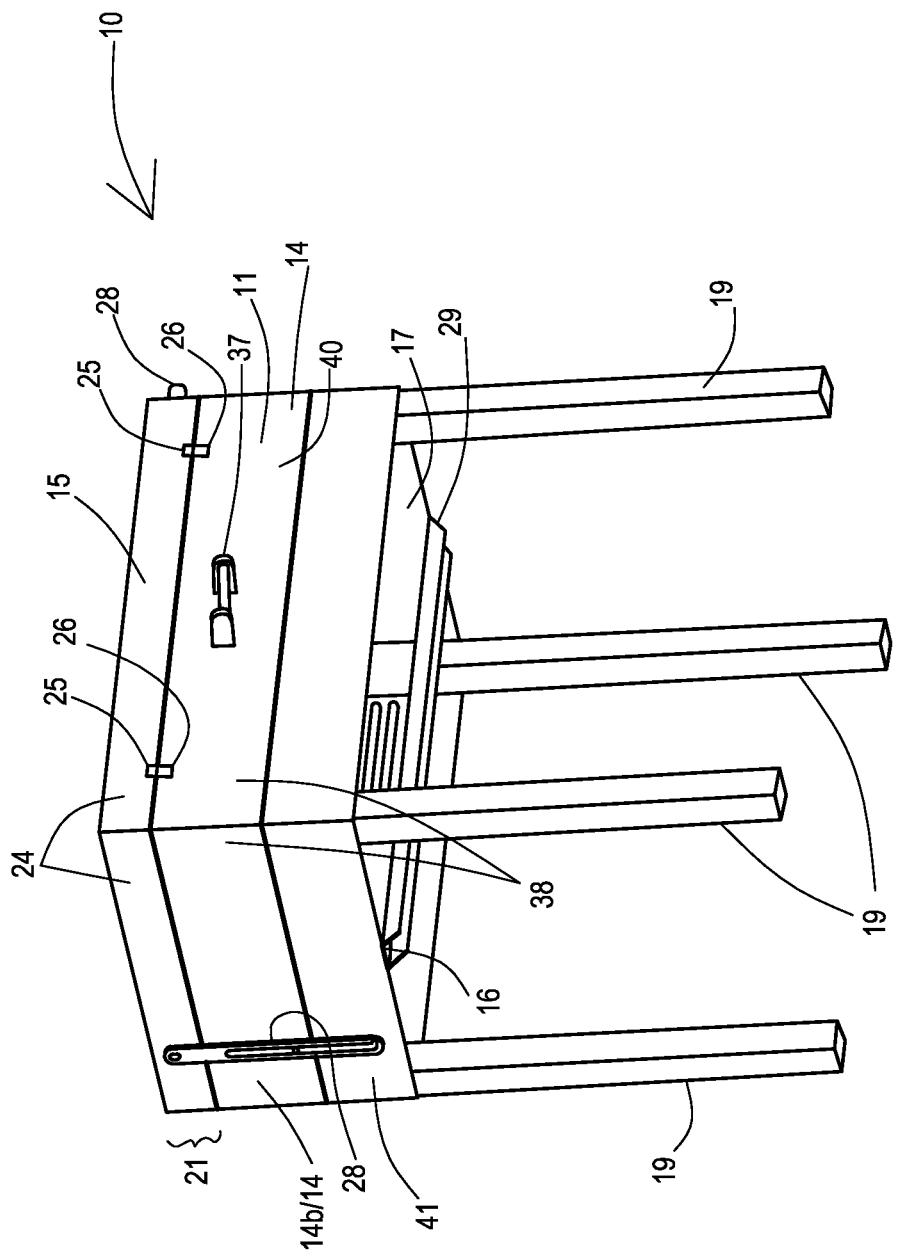

19. The portable steam-producing apparatus 10 of any one of embodiments 1 to 18, wherein said at least one heating element 16 comprises a single heating element 16. See, FIG. 26.

20. The portable steam-producing apparatus 10 of any one of embodiments 1 to 19, wherein said at least one heating element 16 comprises a natural gas or propane gas burner 16.

21. The portable steam-producing apparatus 10 of any one of embodiments 1 to 20, further comprising at least one mounting member 29 sized to mount said at least one heating element 16 onto said lower tank surface 17.

22. The portable steam-producing apparatus 10 of any one of embodiments 1 to 21, further comprising a single mounting member 29 sized to mount said at least one heating element 16 onto said lower tank surface 17.

23. The portable steam-producing apparatus 10 of any one of embodiments 1 to 22, wherein each of said one or more legs 19 is detachable from said water tank 11.

24. The portable steam-producing apparatus 10 of any one of embodiments 1 to 22, wherein each of said one or more legs 19 is permanently attached to said water tank 11. As used herein, the phrase "permanently attached" is used to describe one or more legs 19 that are connected to said water tank 11 in a manner so that the one or more legs 19 are not readily disconnectable from said water tank 11. In other words, the one or more legs 19 are intended to remain connected to said water tank 11 during use and storage.

25. The portable steam-producing apparatus 10 of any one of embodiments 1 to 24, wherein said leg storage surface of said apparatus 10 is proximate said tank bottom surface 17.

26. The portable steam-producing apparatus 10 of any one of embodiments 1 to 25, wherein said leg storage surface of said apparatus 10 is said tank bottom surface 17.

27. The portable steam-producing apparatus 10 of any one of embodiments 1 to 26, wherein each leg 19 comprises a leg latch 30 that locks said leg 19 in either said leg storage position or said leg use position. Typically, leg latch 30 forms an upper portion of leg 19 and leg latch 30 enables leg 19 to be locked in either said leg storage position or said leg use position.

28. The portable steam-producing apparatus 10 of any one of embodiments 1 to 27, wherein each leg 19 comprises a spring-loaded leg latch 30 that locks said leg 19 in either said leg storage position or said leg use position.

29. The portable steam-producing apparatus 10 of any one of embodiments 1 to 28, wherein each leg 19 comprises a leg attachment assembly 32 comprising a leg latch pin 33, a leg latch spring 34, and a leg latch member 30, said leg latch member 30 being attached to said lower tank surface 17. Typically, leg latch pin 33 is disengaged from a first pin position (i.e., when leg 19 is in said leg storage position), leg 19 is moved towards a second position (i.e., towards said leg use position), and re-engaged within said second position so as to lock said leg 19 in said leg use position.

30. The portable steam-producing apparatus 10 of any one of embodiments 1 to 29, wherein said leg use position is one in which each leg 19 extends downward from said lower tank surface 17 of said water tank 11.

Figure 19:
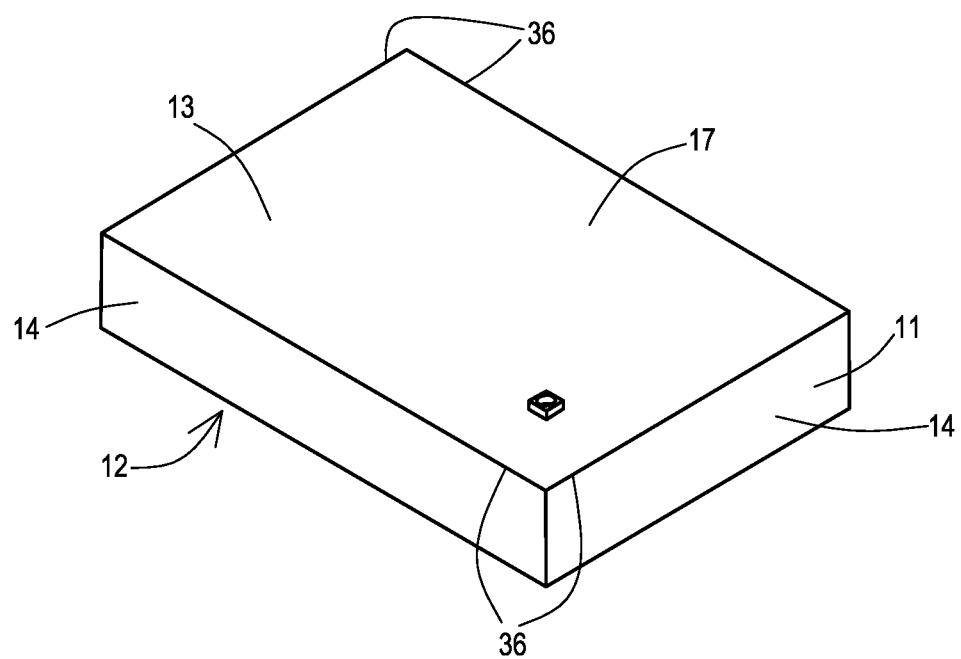

31. The portable steam-producing apparatus 10 of any one of embodiments 1 to 30, wherein said leg use position is one in which each leg 19 (i) extends downward from said lower tank surface 17 of said water tank 11, and (ii) is under and within an outer lower periphery 36 (see, outer lower periphery 36 extending around a perimeter of said water tank 11 in FIG. 19) of said water tank 11.

32. The portable steam-producing apparatus 10 of any one of embodiments 1 to 31, wherein said one or more legs 19 comprise four legs 19.

33. The portable steam-producing apparatus 10 of any one of embodiments 1 to 32, wherein said water tank 11 further comprises a tank handle 37 extending along an outer tank surface 38. See, for example, in FIG. 26.

34. The portable steam-producing apparatus 10 of any one of embodiments 1 to 33, wherein said water tank 11 further comprises a tank handle 37 extending along an outer tank side surface 40 of said one or more tank side walls 14.

35. The portable steam-producing apparatus 10 of any one of embodiments 1 to 34, further comprising a skirt 41 extending along and downward from said water tank 11, said skirt 41 extending below said lower tank surface 17.

Figure 10:
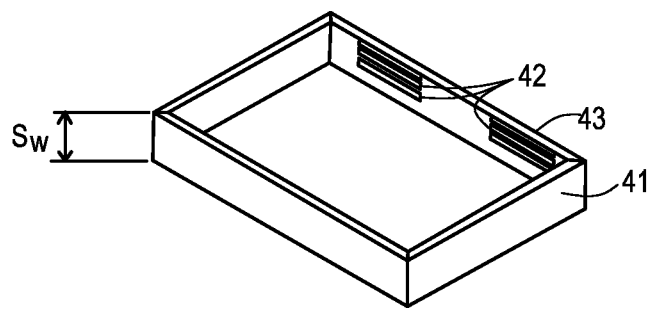
FIG. 10 depicts a perspective view of an exemplary skirt component suitable for use with the exemplary portable steam-producing apparatus shown in FIG. 6.
Figure 11:
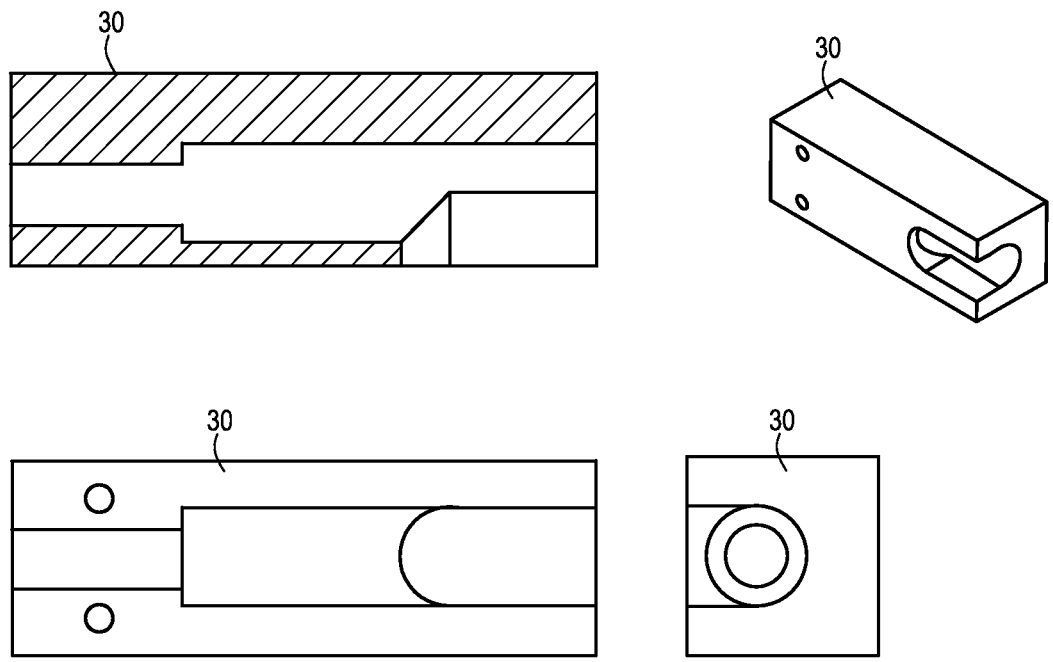
FIG. 11 depicts a perspective view of an exemplary leg latch component suitable for use with the exemplary portable steam-producing apparatus shown in FIG. 6.
Figure 12:
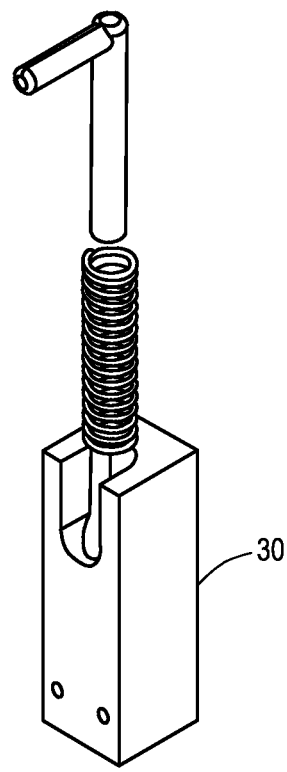
FIG. 12 depicts a perspective view of an exemplary leg latch assembly suitable for use with the exemplary portable steam-producing apparatus shown in FIG. 6.
Figure 13:
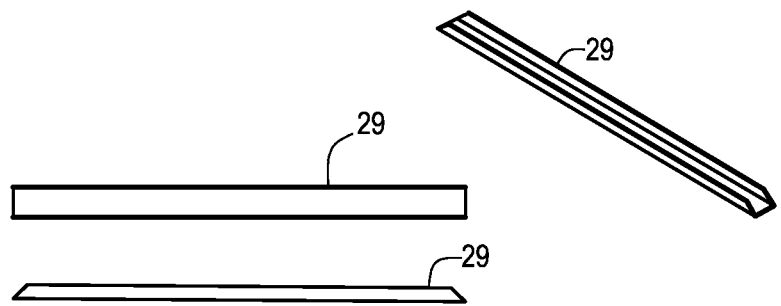
FIG. 13 depicts a perspective view of an exemplary heating element mounting member suitable for use with the exemplary portable steam-producing apparatus shown in FIG. 6.
Figure 14:
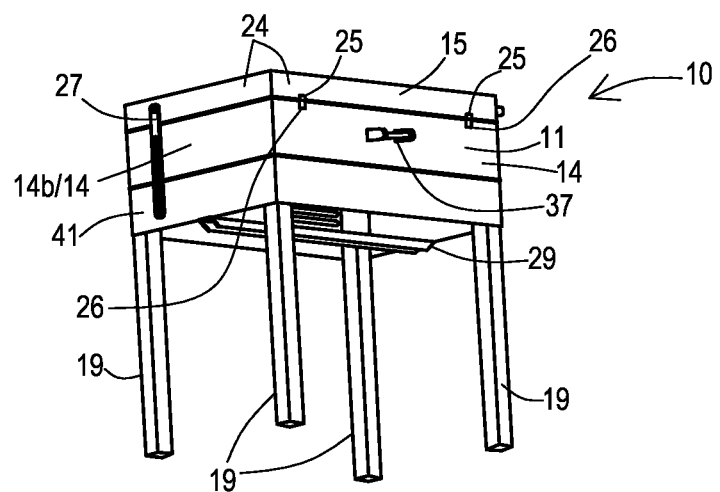
FIG. 14 depicts a perspective bottom view of the exemplary portable steam-producing apparatus shown in FIG. 6.
Figure 15:
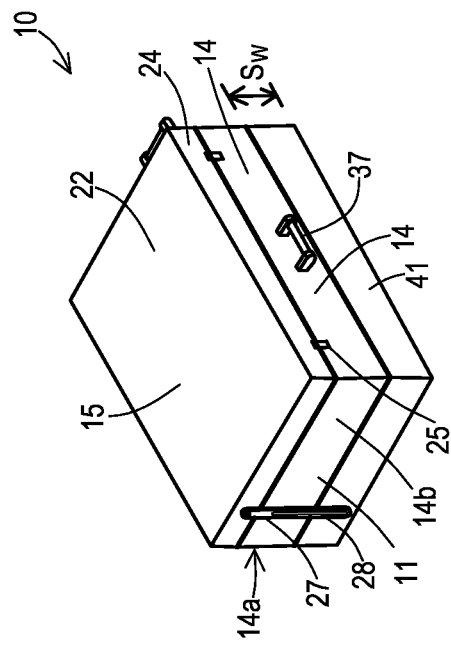
FIGS. 15-26 depict various views of the exemplary portable steam-producing apparatus shown in FIG. 6, as well as components thereof.
Figure 15:
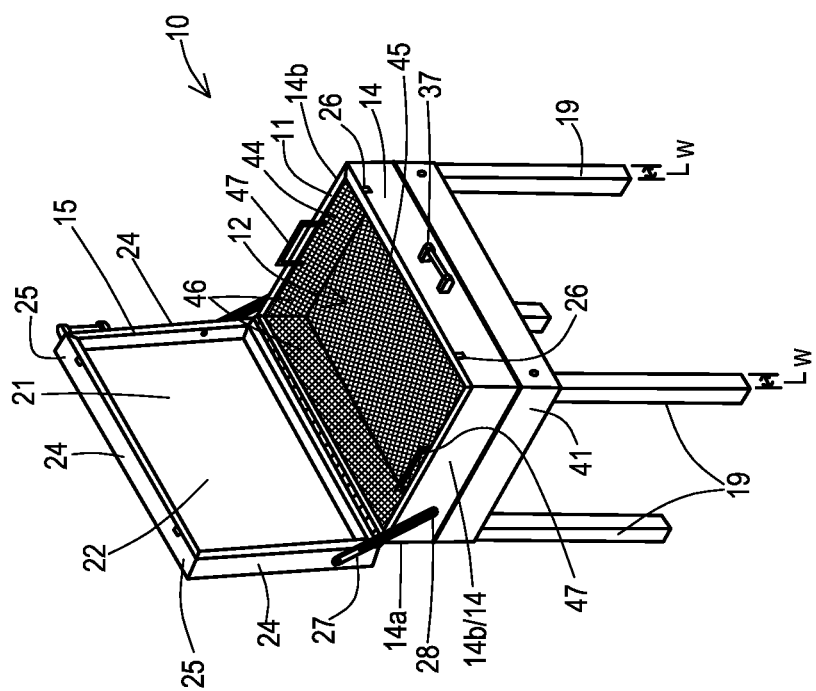
Figure 16:
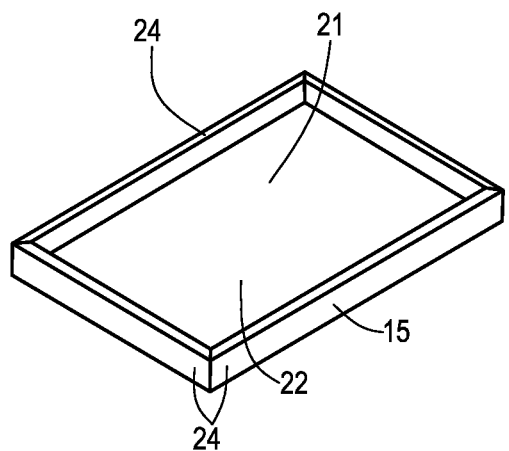
Figure 17:
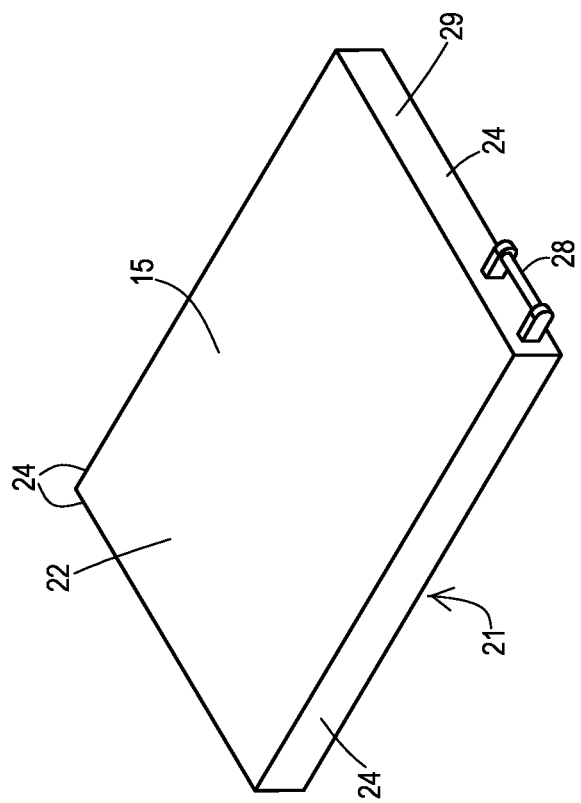
Figure 17:
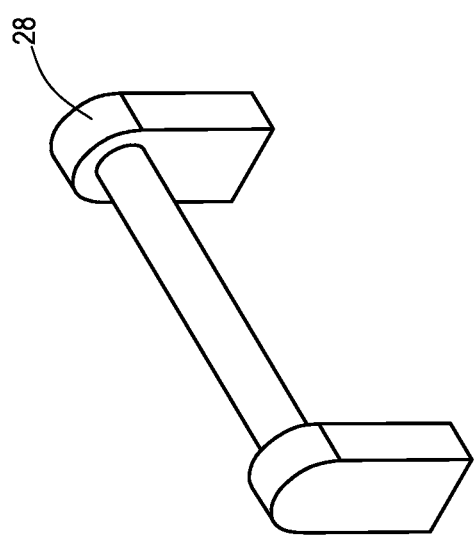
Figure 20:
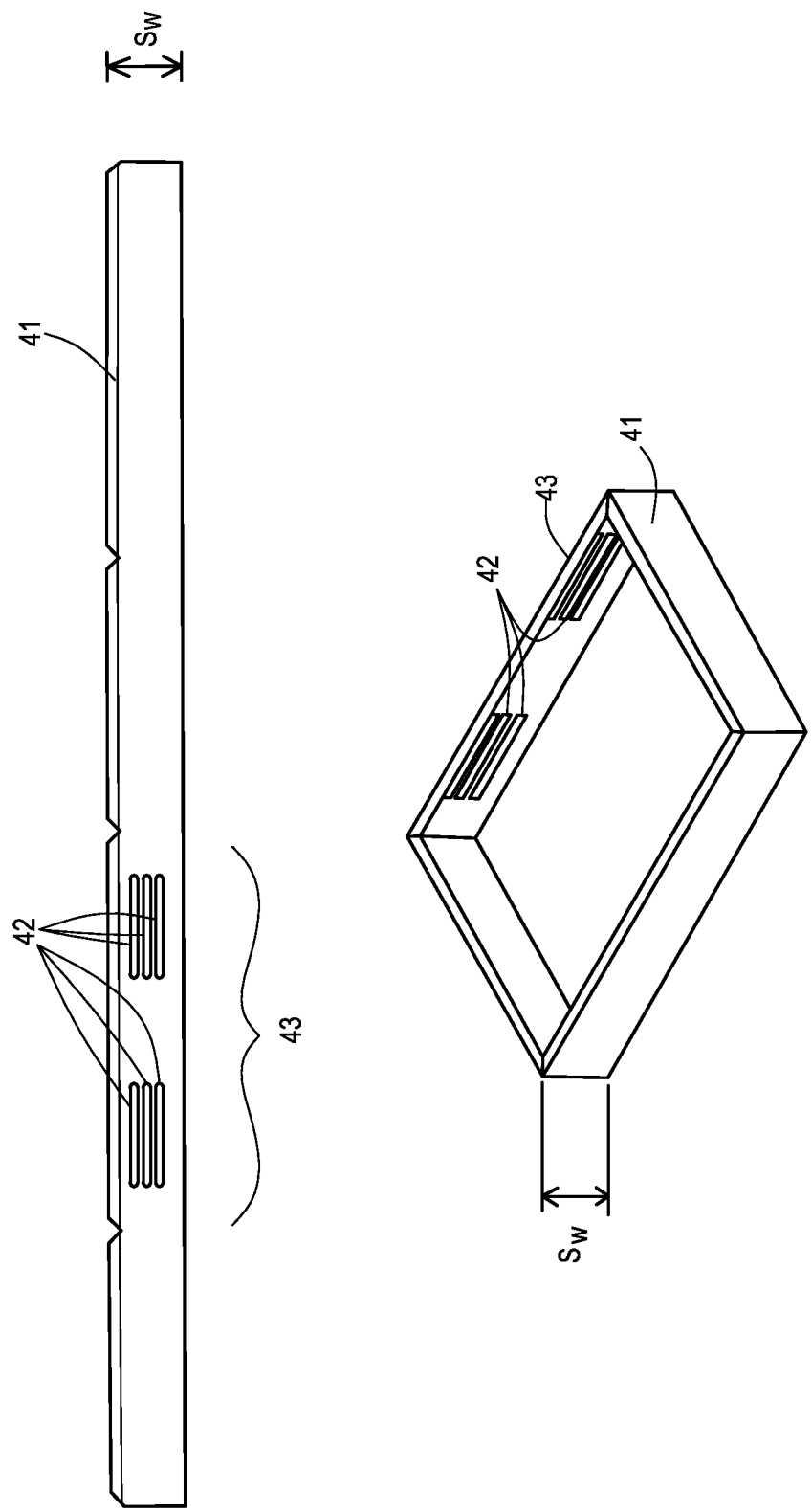
Figure 21:
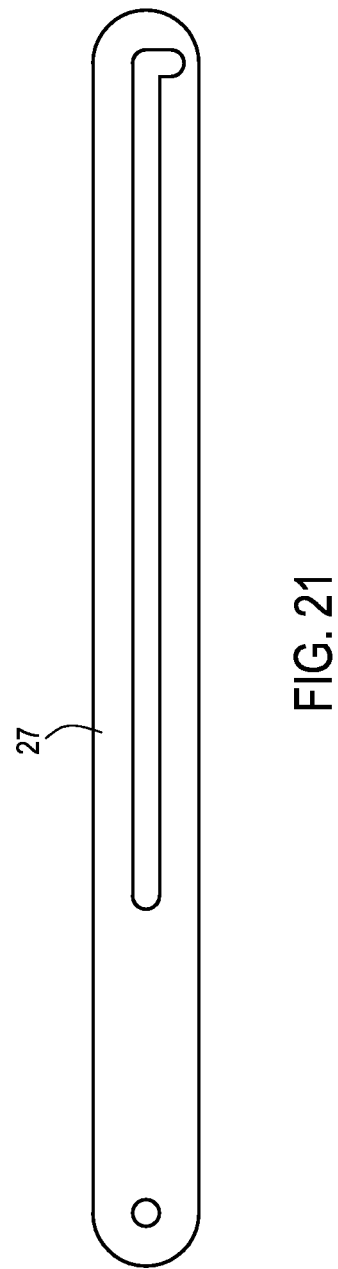
Figure 22:
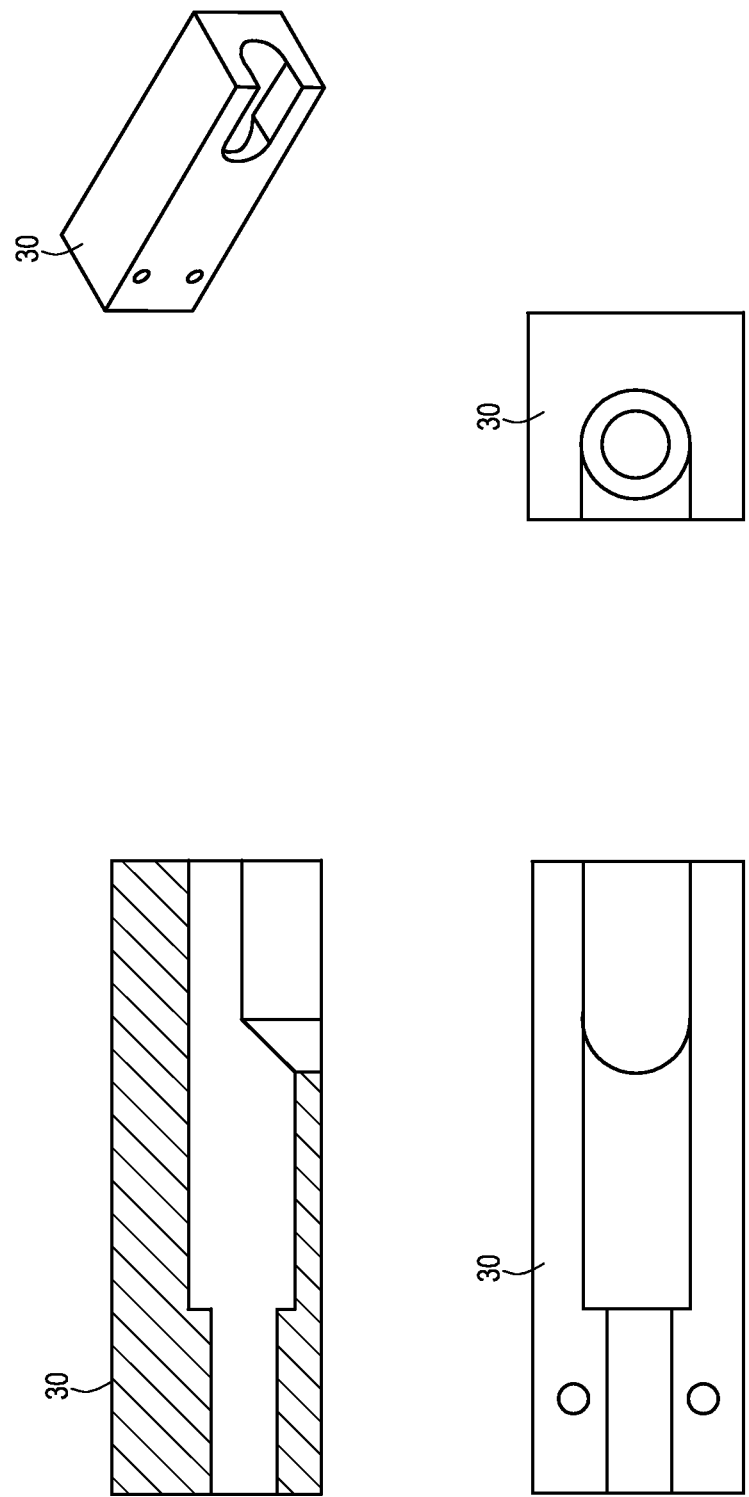
Figure 23:
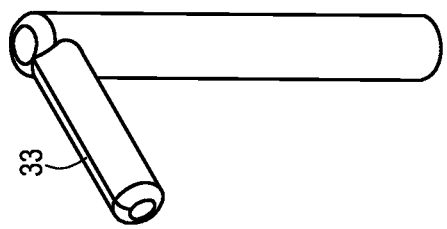
Figure 23:
Figure 23:
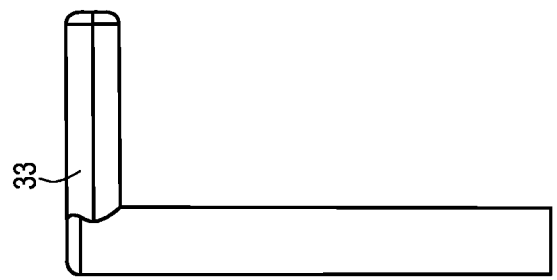
Figure 23:
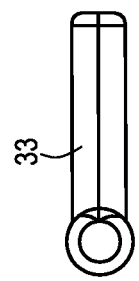
Figure 24:
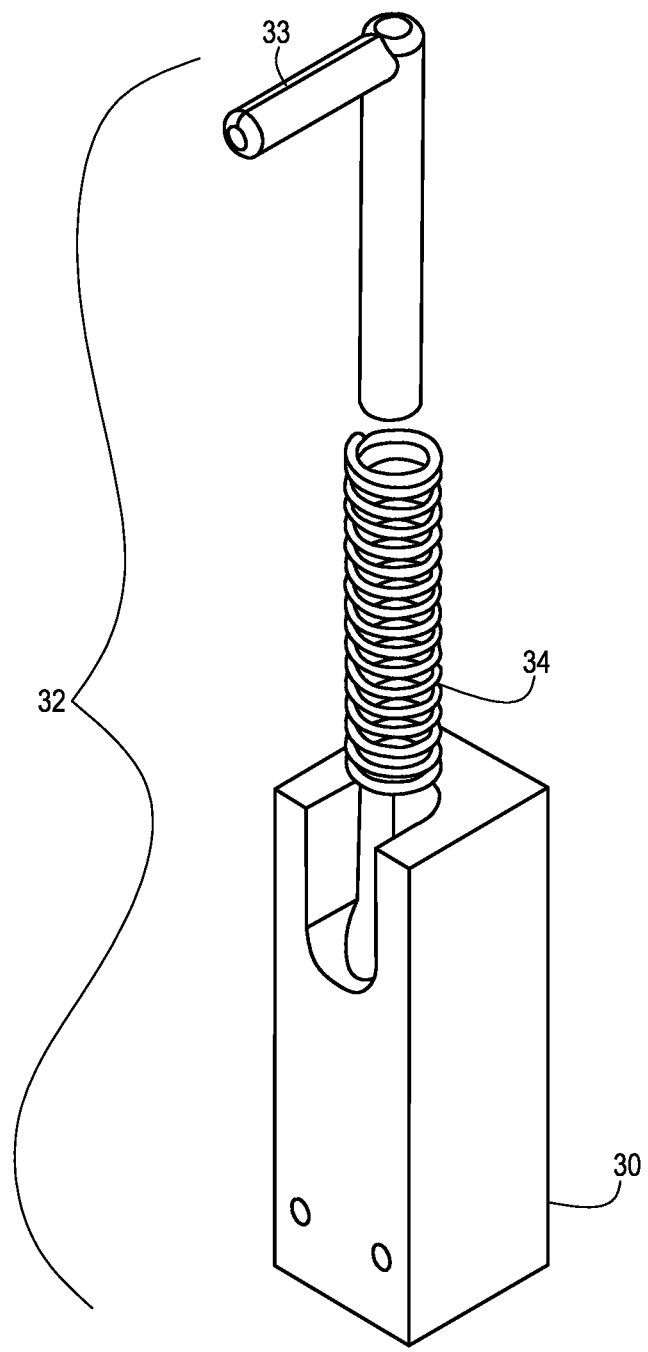
Figure 25:
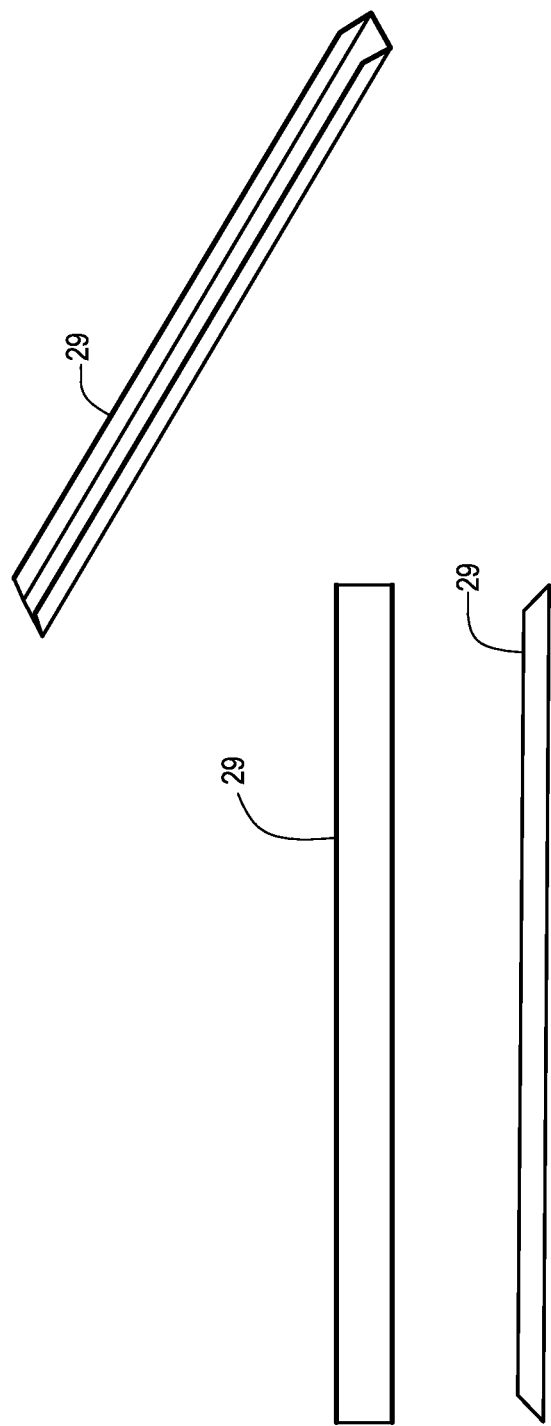

36. The portable steam-producing apparatus 10 of any one of embodiments 1 to 35, further comprising a skirt 41 extending along and downward from said water tank 11, said skirt 41 extending below said lower tank surface 17, said skirt 41 having a skirt width $S_w$ (see, for example, FIGS. 10, 15 and 20) that is greater than a leg width $L_w$ of each of said one or more legs 19 (see, for example, FIG. 15). In this embodiment, when legs 19 are folded into the leg storage position, a lower edge of skirt 41 extends beyond a lower edge of any leg 19. See, for example, FIGS. 2, 7 and 15.

37. The portable steam-producing apparatus 10 of any one of embodiments 1 to 35, further comprising a skirt 41 extending along and downward from said water tank 11, said skirt 41 comprising one or more apertures 42 therein. See, for example, FIGS. 10 and 20.

38. The portable steam-producing apparatus 10 of any one of embodiments 1 to 37, further comprising a skirt 41 extending along and downward from said water tank 11, said skirt 41 comprising a plurality of apertures 42 therein.

39. The portable steam-producing apparatus 10 of any one of embodiments 1 to 38, further comprising a skirt 41 extending along and downward from said water tank 11, said skirt 41 comprising a plurality of apertures 42 therein, said plurality of apertures 42 being present within a single skirt side wall 43 of said skirt 41. In this embodiment, there are no other apertures 42 within skirt 41 other than the plurality of apertures 42 within single skirt side wall 43. See again, for example, FIGS. 10 and 20.

40. The portable steam-producing apparatus 10 of any one of embodiments 1 to 39, wherein said one or more legs 19 are in said leg storage position, and said apparatus 10 is transportable in a manner similar to how a suitcase is transported.

41. The portable steam-producing apparatus 10 of any one of embodiments 1 to 39, wherein said one or more legs 19 are in said leg use position.

42. The portable steam-producing apparatus 10 of any one of embodiments 1 to 41, further comprising a removable screen member 44, said removable screen member 44 having a size and dimensions slightly smaller than said tank volume 12 so that said removable screen member 44 is movable from (i) a screen member use position within said tank volume 12 to (ii) a screen member removed position in which said removable screen member 44 is removed from said tank volume 12.

43. The portable steam-producing apparatus 10 of embodiment 42, wherein said removable screen member 44 comprises a bottom screen portion 45 and one or more side screen portions 46 extending upward from said bottom screen portion 45. See, FIG. 15.

44. The portable steam-producing apparatus 10 of embodiment 42 or 43, wherein said removable screen member 44 comprises a bottom screen portion 45 and four side screen portions 46 extending upward from said bottom screen portion 45.

45. The portable steam-producing apparatus 10 of any one of embodiments 42 to 44, wherein said one or more side screen portions 46 of said removable screen member 44 form a rectangular outer screen shape.

46. The portable steam-producing apparatus 10 of any one of embodiments 42 to 45, wherein said removable screen member 44 further comprises one or more screen member handles 47 extending from said one or more side screen portions 46 thereof.

47. The portable steam-producing apparatus 10 of any one of embodiments 42 to 46, wherein said removable screen member 44 further comprises two screen member handles 47 extending upward from said one or more side screen portions 46 on opposite sides of said removable screen member 44. See again, exemplary removable screen member 44 shown in FIG. 15.

48. The portable steam-producing apparatus 10 of embodiment 46 or 47, wherein each of said screen member handles 47 extend upward into a lid volume 21 when said removable screen member 44 is positioned within said tank volume 12, and said tank lid 15 is in said lid closed position.

49. The portable steam-producing apparatus 10 of any one of embodiments 42 to 48, wherein removable screen member 44 has an overall depth of less than a depth $WT_d$ of said tank volume 12. See, FIG. 18.

50. The portable steam-producing apparatus 10 of any one of embodiments 42 to 49, wherein removable screen member 44 has an overall depth of about ½ of a depth $WT_d$ of said tank volume 12 (or any percentage of the depth $WT_d$ of said tank volume 12 between about 20% and about 98% of depth $WT_d$).

51. The portable steam-producing apparatus 10 of any one of embodiments 1 to 50, further comprising water 18 within said tank volume 12.

52. The portable steam-producing apparatus 10 of any one of embodiments 1 to 51, further comprising a fuel source (not shown), said fuel source being connectable to said at least one heating element 16 of said apparatus 10.

53. The portable steam-producing apparatus 10 of any one of embodiments 1 to 51, further comprising a fuel source (not shown), said fuel source being connected to said at least one heating element 16 of said apparatus 10.

54. The portable steam-producing apparatus 10 of embodiment 52 or 53, wherein said fuel source comprises a gas tank containing natural gas or propane gas.

55. The portable steam-producing apparatus 10 of any one of embodiments 42 to 54, further comprising one or more food items 50 (see FIG. 5) positioned within said removable screen member 44 positioned within said tank volume 12.

56. The portable steam-producing apparatus 10 of any one of embodiments 1 to 55, wherein said apparatus 10 and components thereof (e.g., water tank 11; tank lid 15; heating element 16; and one or more legs 19) are formed from one or more metal materials.

57. The portable steam-producing apparatus 10 of embodiment 56, wherein said one or more metal materials comprise aluminum, stainless steel, or any combination thereof.

Methods of Making Portable Steam-Producing Apparatus:

58. A method of making the portable steam-producing apparatus 10 of any one of embodiments 1 to 57, said method comprising: fabricating one or more apparatus components used to make the portable steam-producing apparatus 10; and assembling the apparatus components with one another.

Methods of Using Portable Steam-Producing Apparatus:

59. A method of using the portable steam-producing apparatus 10 of any one of embodiments 1 to 57, said method comprising: steaming one or more items 50 positioned within the tank volume 12.

60. The method of embodiment 59, wherein said steaming step comprises: heating water 18 within the tank volume 12; and placing one or more food items 50 within a removable screen member 44 positioned within said tank volume 12.

61. The method of embodiment 59 or 60, further comprising closing the tank lid 15 so that the tank lid 15 is in the lid closed position.

62. The method of any one of embodiments 59 to 61, further comprising: moving the tank lid 15 into a lid open position; and removing the one or more items 50 from the tank volume 12.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Preparation of Portable Steam-Producing Apparatus

Exemplary portable steam-producing apparatus as shown in FIGS. 1-26 were prepared using conventional steps (e.g., one or more thermoforming steps, one or more machining steps, and one or more connection/assembly steps, etc.).

It should be understood that although the above-described portable steam-producing apparatus and methods are described as "comprising" one or more components or steps, the above-described portable steam-producing apparatus and methods may "comprise," "consists of," or "consist essentially of" any of the above-described components, features or steps of the portable steam-producing apparatus and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a portable steam-producing apparatus and/or method that "comprises" a list of elements (e.g., components, features or steps) is not necessarily limited to only those elements (or components or steps), but may include other elements (or components or steps) not expressly listed or inherent to the portable steam-producing apparatus and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a portable steam-producing apparatus and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described portable steam-producing apparatus and/or methods may comprise, consist essentially of, or consist of any of the herein-described components and features, as shown in the figures with or without any feature(s) not shown in the figures. In other words, in some embodiments, the portable steam-producing apparatus and/or methods of the present invention do not have any additional features other than those shown in the figures, and such additional features, not shown in the figures, are specifically excluded from the portable steam-producing apparatus and/or methods. In other embodiments, the portable steam-producing apparatus and/or methods of the present invention do have one or more additional features that are not shown in the figures.

It should be further understood that the herein-described portable steam-producing apparatus may be used in other methods such as a conventional grilling method. For example, in some embodiments, charcoal (or other burning component) may be positioned within the water tank so that the portable steam-producing apparatus is used as a charcoal grill. In other embodiments, the water tank may be removable so that the heating element provides direct grilling of food using a fuel such as propane and a removable grill positioned within the portable steam-producing apparatus.

The portable steam-producing apparatus may comprise any number of additional accessories typically used when cooking food. Suitable accessories include, but are not limited to, a grill grate, a charcoal-supporting member for positioning within the water tank, any number of baskets that are sized to be positioned within the water tank, cup holders for attaching to the portable steam-producing apparatus, wheels attached to the portable steam-producing apparatus so as to easily transport the portable steam-producing apparatus, a telescoping handle for assisting with the transporting of the portable steam-producing apparatus, a grill cleaner, tongs, seasoning bags/containers that can be positioned within water within the water tank, a bottle opening positioned along an outer surface of the portable steam-producing apparatus, one or more attachable (or attached) tabletops for providing cooking/steaming surface adjacent the water tank, and any combination thereof.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A portable steam-producing apparatus comprising:
    a water tank comprising a tank volume surrounded by (i) a tank bottom wall and (ii) four tank side walls extending upward from said tank bottom wall;
    a tank lid attached to at least one side wall of said four tank side walls, said tank lid being sized so as to extend over said tank volume and enclose said tank volume when in a lid closed position, said tank lid having a tank lid volume surrounded by (i) an upper lid wall and (ii) four lid side walls extending downward from said upper lid wall;
    at least one heating element positioned along a lower tank surface of said tank bottom wall, said at least one heating element being capable of heating a liquid positioned within said tank volume; and
    one or more legs attached to said water tank, each of said one or more legs being movable from (i) a leg storage position in which a length of each leg is positioned along a leg storage surface of said apparatus to (ii) a leg use position in which each leg extends outward from said water tank,
    wherein said tank lid is movable from said lid closed position to a lid open position while attached to said at least one side wall of said four tank side walls.

2. The portable steam-producing apparatus of claim 1, wherein said tank volume is up to about 12.0 cubic feet ($ft^3$).

3. The portable steam-producing apparatus of claim 1, wherein said water tank further comprises at least one water tank drain hole extending through said tank bottom wall.

4. The portable steam-producing apparatus of claim 1, wherein said tank lid further comprises a lid handle extending along and outward from an outer lid side surface.

5. The portable steam-producing apparatus of claim 1, wherein said at least one heating element comprises a natural gas or propane gas burner.

6. The portable steam-producing apparatus of claim 1, wherein each of said one or more legs is detachable from said water tank.

7. The portable steam-producing apparatus of claim 1, wherein each of said one or more legs is permanently attached to said water tank.

8. The portable steam-producing apparatus of claim 1, wherein each leg comprises a leg attachment assembly comprising a leg latch pin, a leg latch spring, and a leg latch member, said leg latch member being attached to said lower tank surface.

9. The portable steam-producing apparatus of claim 1, wherein said leg use position is one in which each leg (i) extends downward from said lower tank surface of said water tank, and (ii) is under and within an outer lower periphery of said water tank.

10. The portable steam-producing apparatus of claim 1, wherein said one or more legs comprise four legs.

11. The portable steam-producing apparatus of claim 1, further comprising a removable screen member, said removable screen member (I) having a size and dimensions slightly smaller than said tank volume so that said removable screen member is movable from (i) a screen member use position within said tank volume to (ii) a screen member removed position in which said removable screen member is removed from said tank volume, (II) comprising a bottom screen portion and one or more side screen portions extending upward from said bottom screen portion, and (III) comprising one or more screen member handles extending from said one or more side screen portions thereof.

12. The portable steam-producing apparatus of claim 1, further comprising a fuel source, said fuel source being connectable to said at least one heating element of said apparatus, wherein said fuel source comprises a gas tank containing natural gas or propane gas.

13. A portable steam-producing apparatus comprising:
    a water tank comprising a tank volume surrounded by (i) a tank bottom wall and (ii) four tank side walls extending upward from said tank bottom wall;
    a removable screen member positioned within said tank volume, said removable screen member (I) having a size and dimensions slightly smaller than said tank volume so that said removable screen member is movable from (i) a screen member use position within said tank volume to (ii) a screen member removed position in which said removable screen member is removed from said tank volume, (II) comprising a bottom screen portion and four side screen portions extending upward from said bottom screen portion, and (III) comprising two screen member handles extending from said four side screen portions thereof;
    a tank lid attached to a rear tank side wall of said four tank side walls, said tank lid being sized so as to extend over said tank volume and enclose said tank volume when in a lid closed position;
    a lid handle extending along and outward from an outer lid side surface;
    at least one heating element positioned along a lower tank surface of said tank bottom wall, said at least one heating element being capable of heating a liquid positioned within said tank volume; and
    one or more legs attached to said water tank, each of said one or more legs being movable from (i) a leg storage position in which a length of each leg is positioned along a leg storage surface of said apparatus to (ii) a leg use position in which each leg extends outward from said water tank,
    wherein said tank lid is movable from said lid closed position to a lid open position while attached to said rear tank side wall of said four tank side walls.

14. The portable steam-producing apparatus of claim 1, wherein said tank lid further comprises a lid locking component that enables locking of said tank lid to said water tank when in said lid closed position, and said water tank comprises a complementary water tank locking component for each lid locking component to enable locking of said tank lid to said water tank when in said lid closed position.

15. The portable steam-producing apparatus of claim 14, wherein said tank lid further comprises one or more lid positioning members adapted to fix said tank lid in a lid open position, and said water tank comprises a complementary water tank lid positioning member for each lid positioning members to enable fixing of said tank lid in the lid open position.

16. The portable steam-producing apparatus of claim 13, wherein said water tank further comprises at least one water tank drain hole extending through said tank bottom wall.

17. The portable steam-producing apparatus of claim 13, wherein said tank lid comprises a tank lid volume surrounded by (i) an upper lid wall and (ii) one or more lid side walls extending downward from said upper lid wall.

18. The portable steam-producing apparatus of claim 13, wherein (a) said tank lid further comprises a lid locking component that enables locking of said tank lid to said water tank when in said lid closed position, and said water tank comprises a complementary water tank locking component for each lid locking component to enable locking of said tank lid to said water tank when in said lid closed position, and (b) said tank lid further comprises one or more lid positioning members adapted to fix said tank lid in a lid open position, and said water tank comprises a complementary water tank lid positioning member for each lid positioning members to enable fixing of said tank lid in the lid open position.

19. The portable steam-producing apparatus of claim 13, wherein said water tank further comprises a tank handle extending along and outward from an outer tank side surface, said outer tank side surface being on an opposite side of said water tank from said rear tank side wall.

20. A portable steam-producing apparatus comprising:
a water tank comprising a tank volume surrounded by (i) a tank bottom wall and (ii) four tank side walls extending upward from said tank bottom wall, said tank volume being up to about 12.0 cubic feet ($ft^3$) and said water tank further comprising a water tank handle extending along and outward from a front outer tank side surface;

a removable screen member positionable within said tank volume, said removable screen member (I) having a size and dimensions slightly smaller than said tank volume so that said removable screen member is movable from (i) a screen member use position within said tank volume to (ii) a screen member removed position in which said removable screen member is removed from said tank volume, (II) comprising a bottom screen portion and four side screen portions extending upward from said bottom screen portion, and (III) comprising two screen member handles extending from said four side screen portions thereof;

a tank lid attached to a rear tank side wall of said four tank side walls, said tank lid (i) being sized so as to extend over said tank volume and enclose said tank volume when in a lid closed position, and (ii) being movable from said lid closed position to a lid open position while attached to said rear tank side wall of said four tank side walls;

a lid locking component and a complementary water tank locking component for each lid locking component, said lid locking component and said complementary water tank locking component together enabling locking of said tank lid to said water tank when in said lid closed position;

one or more lid positioning members and a complementary water tank lid positioning member for each lid positioning member, said one or more lid positioning members and said complementary water tank lid positioning member together enabling fixing of said tank lid in the lid open position;

a lid handle extending along and outward from an outer lid side surface;

at least one heating element positioned along a lower tank surface of said tank bottom wall, said at least one heating element being capable of heating a liquid positioned within said tank volume; and one or more legs attached to said water tank, each of said one or more legs being movable from (i) a leg storage position in which a length of each leg is positioned along a leg storage surface of said apparatus to (ii) a leg use position in which each leg extends outward from said water tank.

* * * * *